Jan. 17, 1956  G. B. GUTHRIE  2,731,126
CENTERING AND HOLDING DEVICE
Filed Oct. 3, 1952  3 Sheets-Sheet 1

INVENTOR.
George B. Guthrie
BY
*Webb Mackey & Burden*
HIS ATTORNEYS

Jan. 17, 1956  G. B. GUTHRIE  2,731,126
CENTERING AND HOLDING DEVICE
Filed Oct. 3, 1952  3 Sheets-Sheet 2
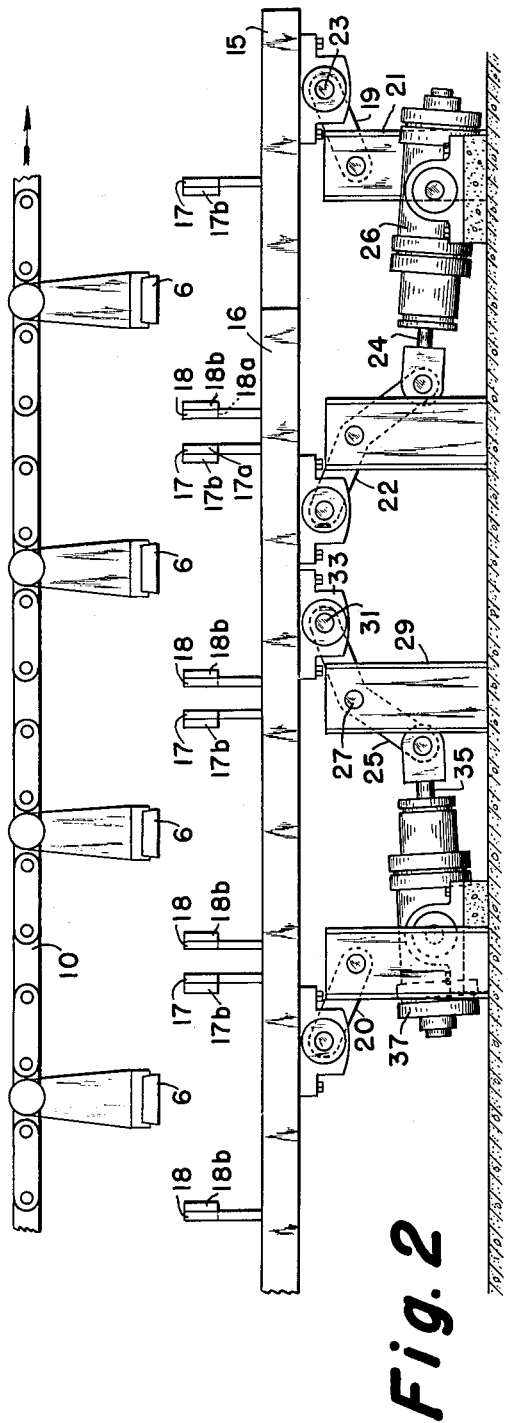
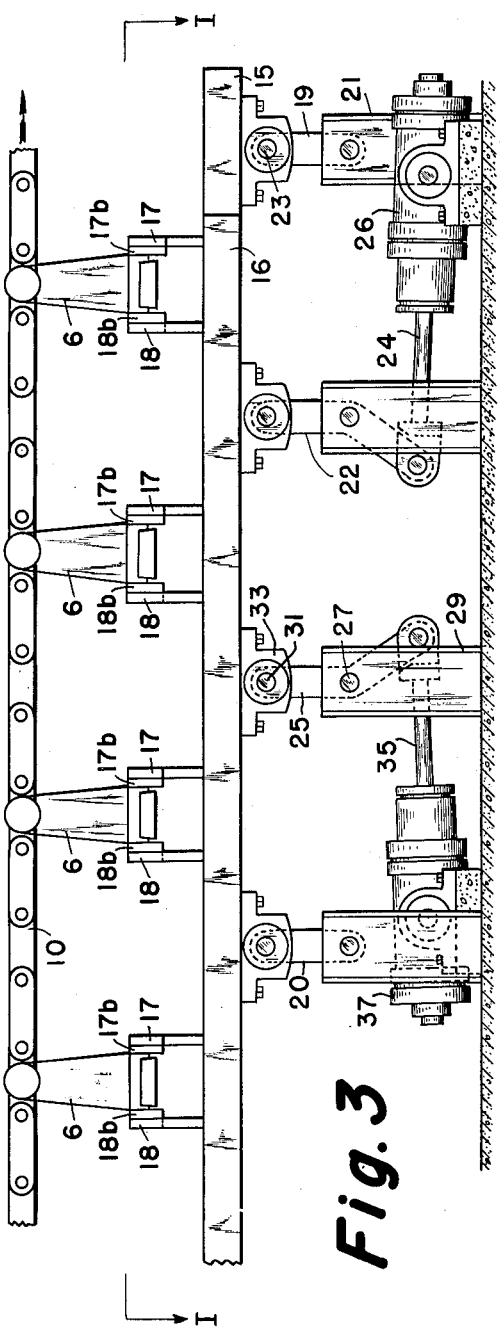
INVENTOR.
George B. Guthrie
BY
Webb Mackey & Burden
HIS ATTORNEYS Jan. 17, 1956

G. B. GUTHRIE 2,731,126

CENTERING AND HOLDING DEVICE

Filed Oct. 3, 1952

INVENTOR.
George B. Guthrie
BY
Webb Mackey & Burden
HIS ATTORNEYS

2,731,126

CENTERING AND HOLDING DEVICE

George B. Guthrie, Chester, W. Va., assignor to Taylor, Smith & Taylor, East Liverpool, Ohio, a corporation of Ohio; The Hall China Company, East Liverpool, Ohio, a corporation of Ohio; and Harker Pottery Co., Chester, W. Va., a corporation of Ohio Application October 3, 1952, Serial No. 312,970

5 Claims. (Cl. 198—19)

This application relates to a centering and holding device for use in automatic machinery in which materials in raw or semi-completed condition are moved from one work station to another, at which stations various individual steps in the manufacture of an article are carried out. My invention may, for example, form part of an automatic ware forming machine used in potteries for forming such articles as dinnerware.

Where a series of processing steps are performed by machine on workpieces (i. e., articles in raw or semi-finished condition which are being processed through the machinery), the workpieces are carried from station to station on conveyors which are generally in the form of endless chains and which have receptacles suspended from them for the workpieces. Generally, the receptacles for the workpieces can and do move relative to the endless chains. For example, the conveyors may move through different levels within the machinery and, therefore, it is necessary to make some arrangement for keeping the receptacles on a horizontal plane so that the workpieces will stay on the receptacles and so that the workpieces will approach a work station in proper position for processing at that station.

In order that the receptacles may remain in a horizontal plane in spite of the fact that the conveyor may move from one level to another, the receptacles are hinged adjacent one of their ends to the conveyor chain and swing therefrom. Inasmuch as the individual steps in the manufacturing processes at each work station are carried on wholly automatically, it is important that the receptacles be in line with the processing machinery at each station. Since the receptacles are freely swinging on the conveyor chain, they cannot be brought in line with the work stations simply by positioning the conveyor chain.

I have invented a centering and holding device which will line up the receptacles at each work station for processing at that station. This device is wholly independent of the motion of the conveyor chain. Of course, the conveyor chain must be stopped while a workpiece is being processed at a work station and, accordingly, my centering and holding device is timed to operate only when the chain is stopped, but it is actuated by mechanism wholly indepedent of the chain to grasp the receptacles and position them in alignment with the processing machinery at each work station and to hold them in that position.

My device includes stop members which lie just below the line of movement of the receptacles when the conveyor is moving. At the proper time the stop members are raised into the path of movement of the receptacles and engage the leading and trailing sides of the receptacles (in the line of movement of the receptacles). Stated differently, the stop members are raised so that one stop engages the front side and another stop engages the rear side of each receptacle adjacent its freely swinging end. A series of pairs of stops, therefore, hold the receptacles at the work stations, each pair of stops holding a receptacle between them. The support for the stops which moves to raise them into the path of movement of the receptacles is so positioned that when two stops hold a receptacle between them, the receptacle and the workpiece carried by it is in correct alignment with the machinery at the work station. After the processing at a particular station has been completed, the stops withdraw out of the line of movement of the receptacles and the conveyor chain can be moved to carry the receptacles to subsequent work stations and bring new workpieces to the stations.

My centering and holding device can be used in any kind of automatic machinery used in manufacturing processes. I have, however, found it to be particularly useful in ware forming machinery used in potteries and, therefore, my invention will be described with reference thereto, but it is to be understood that my invention is not limited to use with ware forming machinery.

In the accompanying drawings, I have illustrated a present preferred embodiment of my invention in which—

Figure 2 is a side elevation view of the portion of the ware forming machinery shown in Figure 1 with certain parts removed for clarity and in which my centering and holding device is in its inoperative position;

Figure 3 is a view similar to Figure 2 but with the centering and holding device in its operative position;

In automatic forming machinery used in potteries to shape green clay pieces prior to firing in a kiln, "bats" or "pugs" of clay are fed onto continous series of plaster of Paris moulds. The conveyor then carries the moulds with the green clay pieces on them to a work station at which there is an automatic jiggering machine. In some jiggering machines,, a rotating roller is brought down against the clay on the mould to form the clay to the desired shape. In other jiggering machines, a piston operating in a hydraulic cylinder rises up beneath the mould and raises the mould towards a rotating roller, thereby pressing the clay against the roller. In the accompanying drawings, I have shown my invention as applied to this latter form of jiggering machine. Such a machine is shown in my United States Patent No. 2,599,910.

Figure 1:
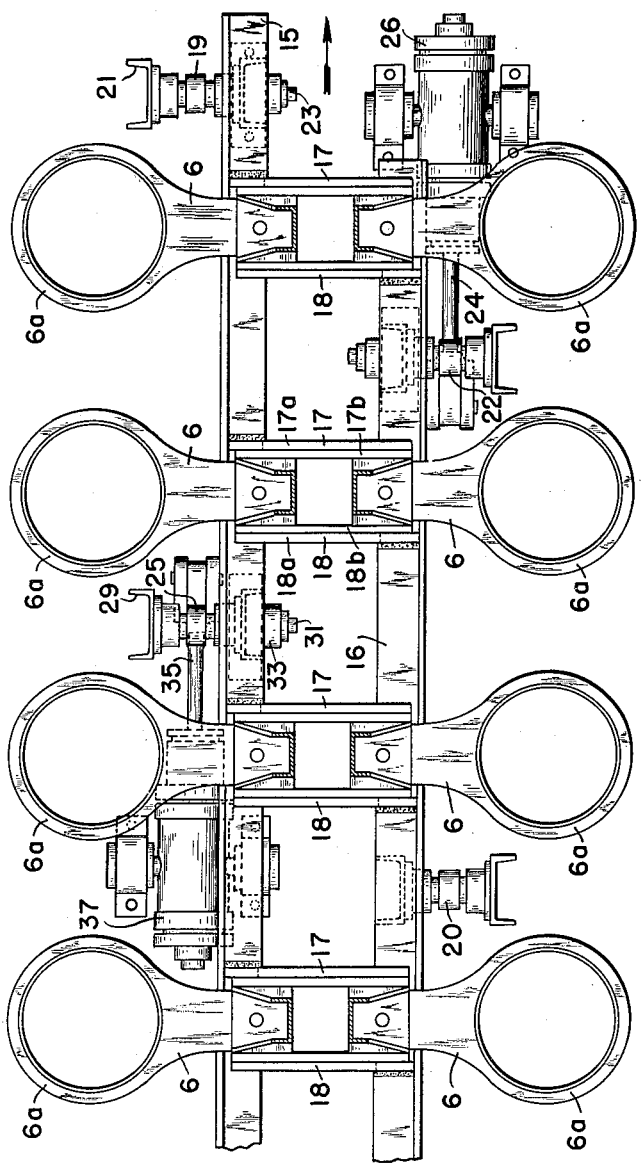
Figure 1 is a horizontal section of a portion of a ware forming machine embodying my invention, the section being taken on the line I—I of Figure 3 and certain parts being removed for clarity.
Figure 4:
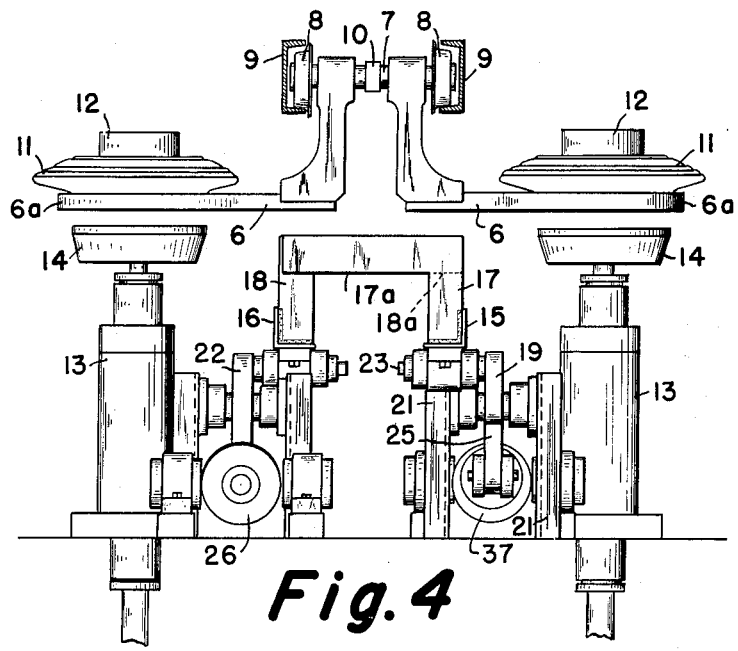
Figure 4 is an end view of the portion of the ware forming machinery shown in Figure 1 with my centering and holding device in its inoperative position.

Figure 1 shows two lines of receptacles or trays 6 for the plaster of Paris moulds, both lines forming part of one conveyor. Referring to Figure 4, it will be seen that the trays are L-shaped when viewed from the side. The vertical arm of the L rotates on a shaft 7 carried by two wheels 8 which run in channel beams 9. The shaft 7 and all that is mounted on the shaft are pulled along the channels 9 by a chain 10. The horizontal arm of the trays 6 terminates in a large ring 6a in which the plaster of Paris moulds 11 are seated (see Figures 4 and 5).

Figure 5:
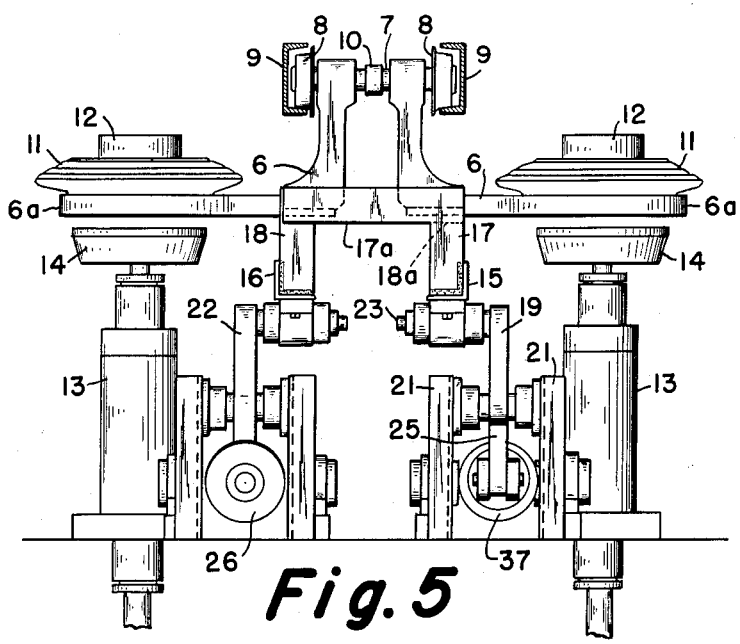
Figure 5 is a view similar to Figure 4 but with my centering and holding device in its operative position.

Figures 4 and 5 show two moulds at a work station at which the jiggering of the clay is performed. Pugs or bats of clay 12 have been dropped onto the moulds 11 and the conveyor is stopped so that the trays 6 are directly above cylinders 13. Pistons 14 working in the cylinders 13 rise up through the rings 6a of the trays and lift the moulds 11 and the clay pieces 12 up against forming rollers. It is obvious that the trays 6 must be accurately positioned over the pistons 14. If the piston 14 was raised up against the rings 6a, they would break or bend the trays and, of course, the clay would not be raised up against the forming rollers. As noted, the trays swing freely on the shaft 7 of the conveyor so that stopping the conveyor chain 10 will not insure the alignment of the trays 6 with the pistons 14. The centering and holding device which I have invented puts each tray as it comes over one of the pistons 14 in correct alignment with the piston and holds it at that position while the piston raises the mould and clay up against the forming roller.

My centering and holding device comprises two stops for each tray which come up on opposite sides of a tray 6 and press it between them so as to hold it temporarily in a solid fixed position. One of the stops engages the leading side of the tray (in the direction of movement of the trays) and the other of the stops engages the trailing side of the tray.

As shown in Figures 1, 2 and 3, several trays may be centered at the same time, all at the same work station or some at one work station and others at an adjoining work station. For example, there may be a cylinder 13 and a piston 14 under three of the trays on each side of the conveyor, making a total of six cylinders and six pistons, all of which operate at the same time to raise the moulds and the clay pieces on them up against six forming rollers. Other trays may be at a work station where the plugs 12 are placed on the moulds 11.

All of the stops which engage the leading sides of the trays are moved by one mechanism and all of the stops which rise up to engage the trailing side of the several trays are moved by another mechanism. All of the stops are of the same construction and the two operating mechanisms are the same. For purposes of clarity, all of the stops which engage the leading sides of the trays and the operating mechanism for these stops will hereinafter be given odd reference numbers and all of the stops which engage the trailing sides of the trays and the operating mechanism for these stops will be given even reference numbers.

The stops and their operating mechanism are best shown in Figures 2 and 3 in which the rings 6a of the trays and the moulds have been removed for purposes of clarity. An angle beam 15 carries the stops 17 which engage the leading side of the trays 6. A link 19 pivoted at one end on a base 21 and at the other end to a pin 23 carried beneath the angle beam 15 and a crank arm 25 pivoted adjacent its center on a pin 27 carried on a post 29 support the angle beam 15. One end of the crank arm 25 is pivoted on a pin 31 carried in a block 33 secured to the angle beam 15. The other end of the crank arm 25 is pivotably connected to the outer end of a piston 35 which moves in a cylinder 37.

When the conveyor moves the trays 6 into position over the pistons 14, conventional timing mechanism which controls the movement of various parts of the forming machine actuates a valve to admit fluid under pressure into the cylinder 37. The piston 35 moves outwardly to the right (viewing Figures 2 and 3) and rotates crank arm 25 about the pin 27 to the position shown in Figure 3. Since the angle beam 15 is supported by the crank arm 25 and the link 19, it rises from the position shown in Figure 2 to the position shown in Figure 3 and lifts with it the stops 17 from a position below the path of travel of the trays up into a position in the line of travel of the trays 6 and against the leading sides of the trays.

An angle beam 16 supports the stops 18 which engage the trailing sides of the trays 6. A link 20 and a crank arm 22 support the angle beam 16 in the same manner as the link 19 and the crank arm 25 support the angle beam 15. A piston 24 operating in a cylinder 26 is connected to and actuates the crank arm 22 in the same manner that the piston 35 is connected to and operates the crank arm 25. When fluid under pressure is admitted to the cylinder 26 (at the same time as fluid under pressure is admitted to the cylinder 37), the piston 24 moves to the left, viewing Figures 2 and 3, and raises the angle beam 16.

The structure of the stops 17 and 18 is best shown in Figures 4 and 5. The stops are L-shaped with one arm horizontal and the other arm vertical. The vertical arms are welded to the angle beams 15 and 16, the number of stops and their position along the angle beam being determined by the number of individual processing units at the work stations and by the distance between the trays on the conveyor. The horizontal arm 17a (or 18a) of each stop has sufficient length so that it engages both trays of the two series of trays carried by the conveyor. The horizontal arms are faced with hard rubber strips 17b, 18b, having the same size as the horizontal arms, and these hard rubber strips actually abut against and engage the sides of the trays.

The angle beams 15 and 16 are positioned on the links 19 and 20 and the crank arms 22 and 25 so that, when they are raised by the pistons 24 and 35, the stops 17 and 18 engage the sides of the trays 6 and firmly hold them in proper alignment with the processing machinery at each work station, for example, the pistons 14 shown in Figures 4 and 5. In the event that, in moving from one station to another, any of the trays start to swing about one of the shafts 7, the stops 17 and 18 rising up into the path of movement of the trays 6 will stop the swinging of any tray and move it into the correct position for processing at a work station.

From the foregoing, it will be appreciated that I have developed a simple reliable device for centering trays having workpieces in correct alignment with processing machinery at a work station. My device not only centers the trays and the work, but also holds the trays and the work in the proper position. My centering and holding device is actuated by mechanism separate from the mechanism which drives the conveyor from which the trays are suspended so that, irrespective of the position of any tray relative to the conveyor when the conveyor is stopped, the trays are brought into proper alignment with the processing equipment at any desired work station.

While I have described a present preferred embodiment of my invention, it is to be understood that it may be otherwise embodied within the scope of the following claims.

I claim:

1. In machinery for manufacturing articles having conveyors for moving workpieces to and from work stations and receptacles for the workpieces secured to the conveyors but having portions movable relative to the conveyors, a device for centering and holding the receptacles in desired positions relative to the work stations comprising retractable stops separately movable to engage the receptacles on opposite sides and in the line of movement of the receptacles, the stops being positioned so that when they engage the receptacles the receptacles are centered and held in the desired positions, and means for moving the stops to and away from the receptacles.

2. In machinery for manufacturing articles having conveyors for moving workpieces to and from work stations and receptacles for the workpieces secured to the conveyors but having portions movable relative to the conveyors, a device for centering and holding the receptacles in desired positions relative to the work stations comprising stops movable to engage the receptacles on opposite sides and in the line of movement of the receptacles, a support for those stops which engage the leading sides of the receptacles, a second support for those stops which engage the trailing sides of the receptacles, and means for moving the supports whereby the stops are carried into the line of travel of the receptacles to engage them on opposite sides.

3. In machinery for manufacturing articles having conveyors for moving workpieces to and from work stations and receptacles for the workpieces secured to the conveyors but having portions movable relative to the conveyors, a device for centering and holding the receptacles in desired positions relative to the work stations comprising stop members having portions extending transversely to the line of movement of the receptacles, which portions engage the receptacles on the leading and trailing sides in the direction of movement of the receptacles, the transverse portions having sufficient length to engage two series of receptacles moving parallel to each other, a support for those stops which engage the leading sides of the receptacles, a second support for those stops which engage the trailing sides of the receptacles, and means for moving the supports whereby the stops are carried into the line of travel of the receptacles to engage them on opposite sides.

4. In machinery for manufacturing articles having conveyors for moving workpieces to and from work stations and receptacles for the workpieces secured to the conveyors but having portions movable relative to the conveyors, a device for centering and holding the receptacles in desired positions relative to the work stations comprising L-shaped stop members having horizontally extending arms which engage the receptacles on the leading and trailing sides in the direction of movement of the receptacles, supports for the stop members secured to the vertical arms of the stops, the supports being movable to carry the stop members against the receptacles and being positioned so that when the stops engage the receptacles they place the receptacles in the desired positions relative to the work stations, and means for moving the supports.

5. In machinery for manufacturing articles having conveyors for moving workpieces to and from work stations and receptacles for the workpieces secured to the conveyors but having portions movable relative to the conveyors, a device for centering and holding the receptacles in desired positions relative to the work stations comprising a series of stop members having portions which engage the receptacles on the leading sides of the receptacles in the direction of movement of the receptacles, a second series of stop members having portions which engage the trailing sides of the receptacles a beam supporting each series of stop members, a link pivoted at one of its ends to each beam and pivoted at its other end to a base, a crank arm pivoted adjacent its center to a base and at one of its ends to one of the beams, and means operatively connected to the other end of each crank arm for rotating the arm about its central pivot whereby on rotation of the crank arm the stop members are raised up into the path of movement of the receptacles and engage the leading and trailing sides thereof to place and hold the receptacles in desired positions.

References Cited in the file of this patent
UNITED STATES PATENTS

| | | |
|---|---|---|
| 1,511,662 | Dirkson et al. | Oct. 14, 1924 |
| 2,632,936 | Skipper et al. | Mar. 31, 1953 |